United States Patent [19]

Kneidel et al.

[11] Patent Number: 4,621,838

[45] Date of Patent: Nov. 11, 1986

[54] INSERT FOR INSULATED STEAM INJECTION TUBING

[75] Inventors: Kurt E. Kneidel, Alliance; Minh Luu, N. Canton, both of Ohio

[73] Assignee: The Babcock & Wilcox Company, New Orleans, La.

[21] Appl. No.: 607,861

[22] Filed: May 7, 1984

[51] Int. Cl.⁴ ............................................. F16L 55/00
[52] U.S. Cl. ......................................... 285/41; 285/48; 285/50; 285/371; 285/398; 166/242
[58] Field of Search ..................... 285/41, 47, 48, 50, 285/53, 54, 138, 371, 398; 166/242, 303, DIG. 1

[56] References Cited

U.S. PATENT DOCUMENTS

| | | | |
|---|---|---|---|
| 2,118,428 | 5/1938 | Chrisman | 166/242 |
| 3,680,631 | 8/1972 | Allen et al. | 166/242 |
| 4,518,175 | 5/1985 | Richards et al. | 285/53 |
| 4,538,834 | 9/1985 | Brady et al. | 285/138 |

FOREIGN PATENT DOCUMENTS 1064304 8/1959 Fed. Rep. of Germany ...... 285/371

Primary Examiner—Richard J. Scanlan, Jr.
Assistant Examiner—Anthony Knight
Attorney, Agent, or Firm—Robert J. Edwards; James C. Simmons

[57] ABSTRACT

An insert for insulating the area of the coupling two doublewalled tubing segments of an insulated steam injection tubing string. The insert is mounted to overlie both of a pair of adjacent tubing segment end portions radially inwardly thereof. In accordance with one aspect of the invention, the insert has two walls which are spaced apart and connected at their ends to define an annular space therebetween in which thermal insulation may be provided. In accordance with another aspect of the invention, the insert is engaged to one of the end portions and is spaced from the other of the end portions to prevent flowthrough of vapor and to allow vapor to enter between the insert and coupling and condense to provide an insulating medium.

30 Claims, 6 Drawing Figures

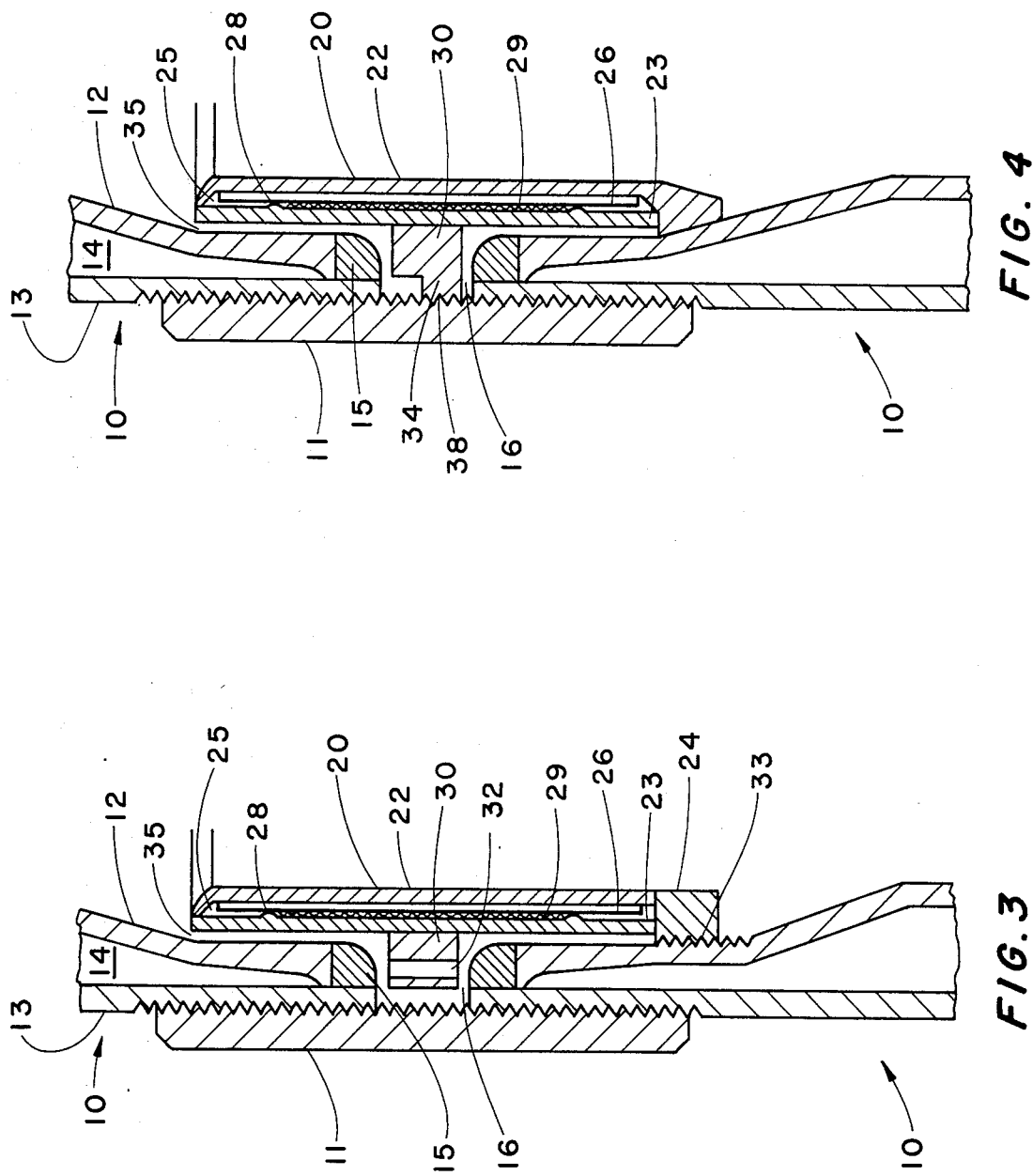

INSERT FOR INSULATED STEAM INJECTION TUBING

BACKGROUND OF THE INVENTION

This invention relates to insulated tubing for conveying vapors such as the injection of steam downwardly into an oil-bearing formation to enhance oil recovery, the tubing being of the type having plural segments of insulated, double-walled tubing coupled to form a long string and, more particulary, to such a tubular apparatus which is provided with a cylindrical insert at one or more of the joints of the tube segments to reduce heat loss at the joints.

The injection of pressurized, high temperature steam into oil-bearing formations has become a significant method of enhancing oil recovery. In a typical arrangement, segments of insulated, double-walled tubing are connected together by threaded sleeve couplings. Each segment of the double-walled tubing structure is composed of inner and outer concentric tubes radially separated by an annulus which is sealed at each end of the tubes and provided with an insulating medium. Adequate insulation of the injection string is desired to assure a maximum steam quality at the bottom of the string.

The annulus is sealed at the ends of each tubing segment by seal rings or bushins welded to the inner and outer tubes, or by outwardly flaring the ends of the inner tube and welding the inner and outer tubes to each other at their ends. The outer surface of each of the extremities of the two outer tubes of each pair of adjacent segments are received in the bore of a coupling wherein they are connected by a threaded engagement. Since the inner and outer tubes are connected together in the coupling area, a significant quantity of heat can be lost through the weld or other connection means between the inner and outer tubes and through the coupling.

SUMMARY OF THE INVENTION

An object of the present invention is to provide a means for reducing heat loss in the area of the coupling.

It is another object of the present invention to provide such a means whereby a body of stagnant water resulting from condensed steam may be formed in the coupling area as an insulating medium.

It is a further object of the present invention to provide such a means which is rugged in construction and dependable in use.

The various features of novelty which characterize this invention are pointed out with particularity in the claims annexed to and forming a part of this specification. For an understanding of the invention, its operating advantages and specific objects attained by its use, reference should be had to the accompanying drawings and descriptive matter in which thrre is illustrated and described a preferred embodiment of the invention.

BRIEF DESCRIPTION OF THE DRAWINGS

In the accompanying drawings, forming a part of this specification, and in which reference numerals shown in the drawings designate like or corresponding parts throughout the same.

FIG. 3 is a half cross-section view of a portion of an insert according to a second embodiment of the invention;

FIG. 4 is a view similar to that of FIG. 3 of another embodiment of the invention.

DETAILED DESCRIPTION OF THE PREFERRED EMBODIMENTS

Figure 1:
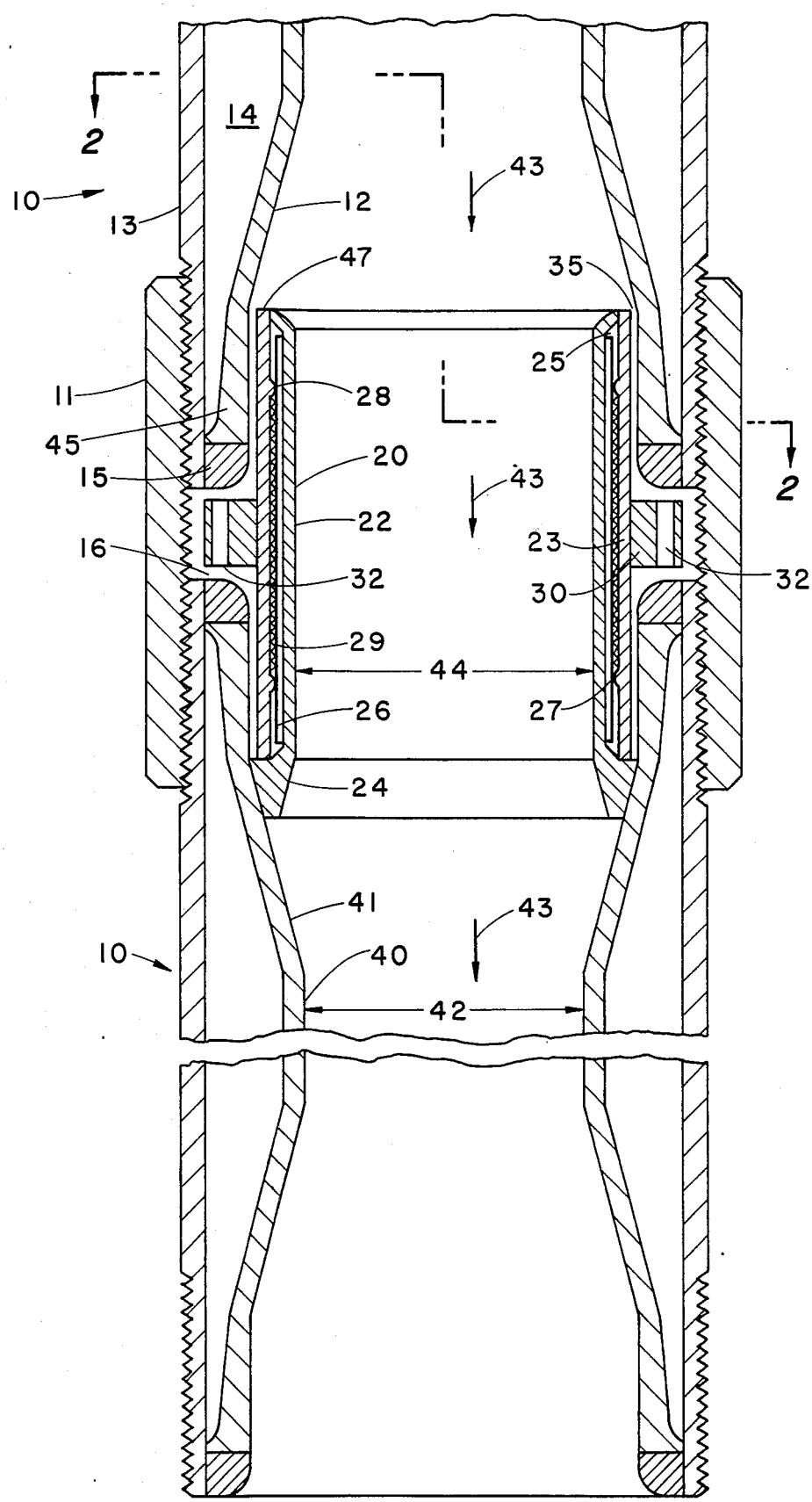
FIG. 1 is a vertical cross-sectional view of a portion of a tubular steam injection string including an insulation insert in accordance with a preferred embodiment of the invention.

FIG. 1 illustrates a portion of a tubular steam injection string having a plurality of elongated tubular segments 10 joined end-to-end preferably by couplings 11, only one of which is shown. Each tubular segment 10 comprises a double-walled tubular unit of an inner tube 12 and a concentric outer tube 13. The tubes 12 and 13 are radially spaced from each other to provide annulus 14.

Each inner tube 12 has a central main cylindrical body 40 which defines a cylindrical bore path, which may be described has having a diameter illustrated at 42 in FIG. 1, which provides an unobstructed fluid flow path through the injection string. The end portions 41 and 45 of each inner tube 12, at each end of the main cylindrical body 40, flare radially outwardly toward the respective outer tube 13 thereby defining an area of additional space surrounding the cylindrical bore path. The inner and outer tubes are sealed and fixed to each other at their extremities by circumferential welds 15 whereby each annulus may be evacuated and/or otherwise provided with insulation to reduce heat loss from steam flowing in the inner tube.

Flow of steam downwardly in the tubular string is illustrated by arrows 43 in FIG. 1. Each coupling 11 connects the adjacent ends of two tubular segments 10 by threaded engagement with the respective outer tubes 13 of adjacent upper and lower tubular segments 10 and maintains the segments in an axial end-to-end spaced alignment. However, other types of coupling means are meant to also come within the scope of the present invention. A gap 16 will normally exist between the opposed ends of the adjacent segments 10.

Figure 2A:
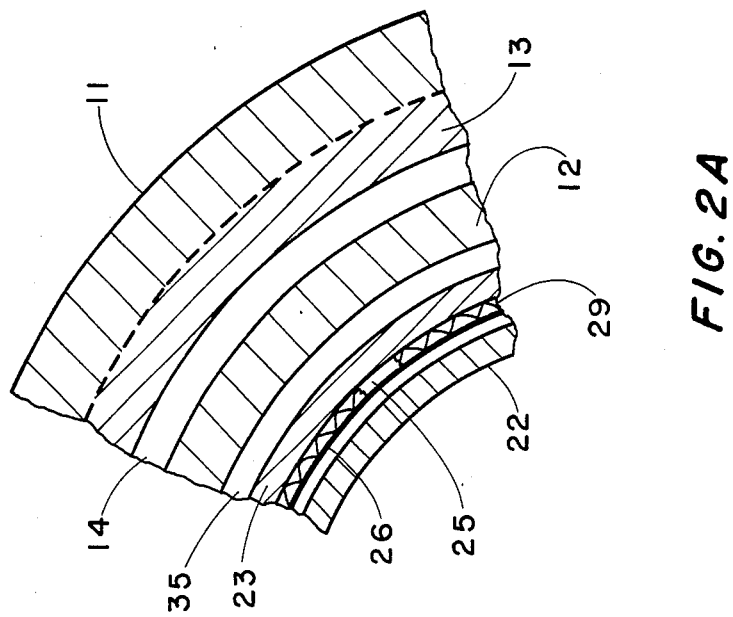
FIG. 2A is an enlarged detail view of a portion of the right side of FIG. 2.
Figure 2:
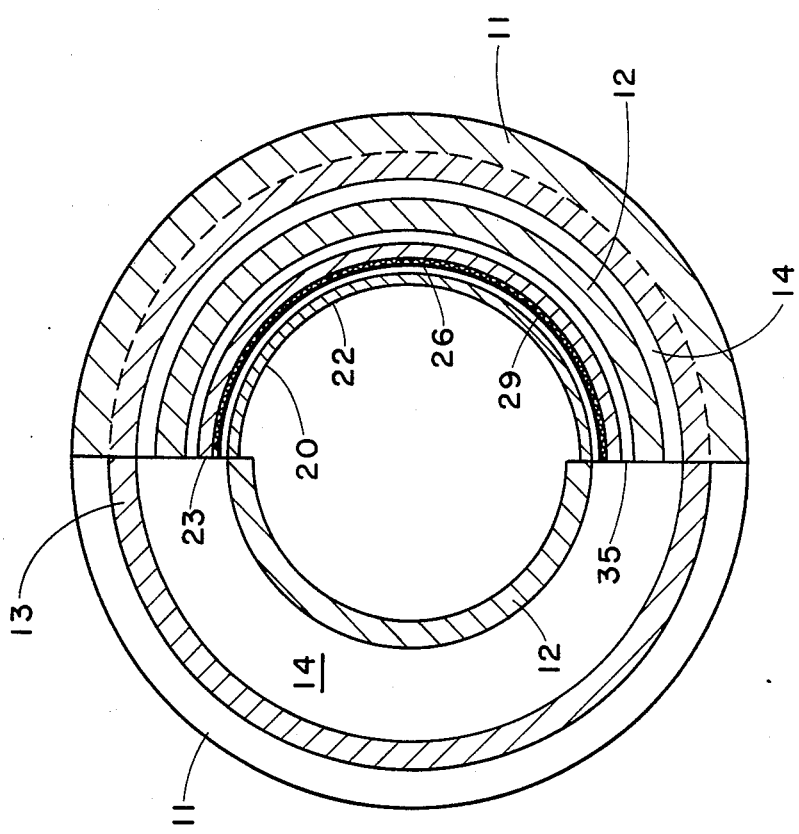
FIG. 2 is a view taken along line 2—2 of FIG. 1.

A significant amount of heat may be lost through the couplings 11 and the tubing in the vicinity of the couplings 11 if adequate insulation is not also provided at these points. In order to provide such insulation, cylindrical body 20 is provided in the tubular steam injection string in the region of each coupling 11 generally between the bore path 42 and respective end portions 41 and 45 of adjacent inner tubes 12 and overlies the respective end portions 41 and 45 radially inwardly thereof of both such adjacent inner tubes. The cylindrical insulation body 20, as shown in FIGS. 1 and 2, is thus located generally outside of the cylindrical bore path to prevent the fluid flow through the tubular string from being obstructed by the insulation body 20.

The insert 20 has a cylindrical inner shell 22 with an inner diameter, illustrated at 44, which is approximately equal to the inner diameter 42 of the main cylindrical body 40 of the inner tube 12 so that the cylindrical bore pathway may remain generally unobstructed. The insert 20 also has a cylindrical outer shell 23 concentrically mounted about and spaced from the inner cylindrical shell 22 to define an annular space 25 therebetween in which insulation is preferably provided. The outer shell 23 may be sealingly connected at its respective ends, such as by welding, to the inner shell, so that the space 25 may be evacuated to provide a vacuum for insulating. Reflective foil 26 and glass yard 29 are provided in the annular space 25 and circumscribe the outer surface of the cylindrical inner shell 22 to provide insulation. Other insulation materials which may be used include, but are not limited to, alumina-silica, calcium silicate, glass, mineral and kaolin fibrous insulations; powder insulations such as diatomaceous silica, perlite, vermiculate and santocel; foam insulations such as borosilicate; and other forms of multilayer insulation. The annular space may be back-filled with a low-conductive gas, e.g., argon, after its evacuation to improve the inert performance. It is desirable that the insulation have high compressive strength. The walls 22 and 23 of the insert are preferably thin to allow low conduction heat loss. Accordingly, radially extending ribs 27 and 28 are preferably provided on the inner wall of the outer shell 23 at circumferentially and axially spaced locations within the annular space 25 to abut the inner shell to assure suitable separation of the shells 22 and 23 and to maintain a desired minimum width of the annular space 25. However, these ribs 27 and 28 may alternatively be provided on the outer wall of the inner shell in which case assembly of the insert 20 has been found to be easier. However, the glass yarn 29 or other suitable high compression strength material may be used in lieu of the ribs 27 and 28. A passage may be provided to the annular space 25 to permit it to fill with steam which may then condense to form condensate in which case the condensate may provide the insulating effect, and operating stresses due to steam pressure and differential thermal expansion may be significantly reduced.

Means, as shown in FIG. 1, collar 30 is preferably provided around the outer shell 23 to strengthen the insert and/or to reduce thermally conducting circulation currents in a body of water in space 16. The collar extends into the space at the gap 16 between the insert and coupling. The stiffening collar 30 preferably includes a plurality of perhaps 48 bores 32 spaced circumferentially thereabout and the axes of which are substantially parallel to the longitudinal axis of the tubing segments 10 to divert leakage flow away from the coupling surface if such leakage should develop due to poor mating of the insert and flared end portion of the lower tube segment, and to reduce the thermal conductivity of the collar.

As shown in FIG. 1, the insert 20, at its upper end 47, is spaced from the tubular segment 12 by an annular annular space 35. A body fo stagnant water in the space 35 and gap 16 between the insert 20 and the coupling 11 may provide an insulating effect. Since the insert is placed in proximity to the fluid stream which will flow through the bore path of the injection string, it is desired that the flow of vapor through the space 35 and 16 between the insert 20 and the coupling 11 and beyond the bottom of the insert and back into the bore path be eliminated or decreased to an insignificant value. In order to prevent any steam which enters space 35 from flowing downwardly beyond the bottom of the insert and back into the bore path and to allow the steam, as a result of prevention of such flowthrough, to condense to form a body of stagnant water in the gap for insulation thereof, the insert 20 is provided with a lower end portion 24, as shown in FIG. 1, which is tapered and circumferentially in contiguous relation over its surface to closely fit, preferably in fluid tight engagement, against the mating flared inner surface of the upper end portion 41 of the lower segment 10. The insert 20 may be fixed at this location by an interference fit and/or it may be circumferentially welded or braxed at its lower end to the inner tube 12. The insert 20 may, however, also be readily removable. Thus, as shown in FIG. 3, the lower end 24 of the insert and the inner tube 12 are interconnected via a threaded connection 33. Alternatively, in the embodiment of FIG. 4, the stiffening collar 30 includes a radial extension 34 that projects through the gap 16 and is connected to the coupling 11 via a threaded connection 38.

It has been determined, for two axially spaced tubing segments that are approximately thirty or forty feet long, that the coupling heat loss increases greatly as the distance over which both of the inner tube end portions 41 and 45 are covered is decreased below 0.2 feet and in particularly below 0.1 feet. Therefore, in accordance with a preferred embodiment of the present invention, the insert 20 covers at least 0.1 foot, more preferably at least 0.2 foot, of the flared end portions of each of the two axially adjacent tubing segments 10. The insert 20 is preferably located within the tubing string such that its upper end 47 is located below the upper end of the coupling 11 whereby the coupling extends axially beyond end 47 to prevent the upper tubular 10 from striking the insert 20 and damaging it or adversely affecting its fit with the end portion 41 of the lower tubular as the upper tubular is lowered into engagement with the lower tubular.

The end portions 41 and 45 may be extensions of the inner tubes of they may be flared members commonly called spool pieces welded to the inner tubes. If the end portions 41 and 45 differ in their shapes, it will be difficult to connect the insert 20 with both end portions 41 and 45. As a result, the fit with the end portion 41 may be adversely affected and may result in the undesired flowthrough of steam as previously described. As illustrated at 35, in accordance with an aspect of the present invention, the insert is spaced a distance such as approximately one-sixteenth inch from the upper inner tube end portion 45 to prevent its fit with the lower inner tube end portion 41 from being thusly adversely affected because of any fit of the insert to end portion 45 and to permit steam to bypass through the space 35 into space 16 where its flow may be stopped by the resultingly fluid tight fit of the insert against the upper flared end portion 41 of the lower tubing segment 10.

If, for example, the insulation in annular space 25 is mainly comprised of a 0.020 inch air gap and a reflective aluminum foil, the insert will be subjected to very high stresses during steam injection. The primary sources of stress are in the high stream pressure and differential thermal expansion between the two steel walls. Two 0.015-inch rounded ribs 27 and 28 may be provided at both ends of the annular space 25 and 1.5-inch length of glass yarn may be provided intermediate the ribs to maintain the annular space 25 under these stresses. A three-quarter inch ring, comprising the stiffening collar 30, may be welded about the outer shell of the insert body to further strengthen the double-walled structure.

Figure 5:
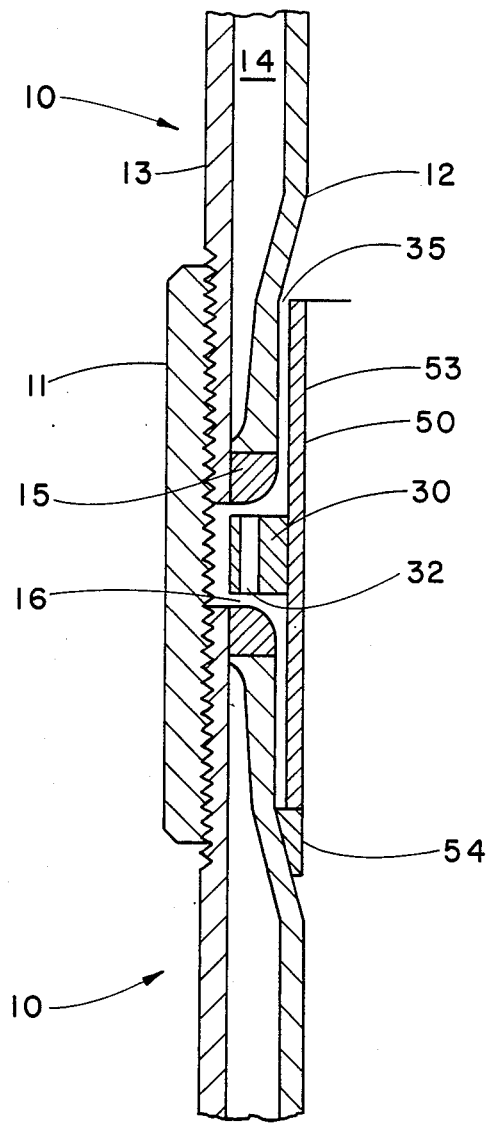
FIG. 5 is a view similar to that of FIG. 3 of yet another embodiment of the invention.

Although a double-walled insert with the increased insulation which may be provided in the annular space 25 is preferred, under some conditions the additional insulation achievable with a double-walled insert may not warrant the use of a double-walled insert, and a single-walled insert 53, as is schematically illustrated in FIG. 5, may be employed. The insert 53 comprises a single member 50 which overlies both inner tube end portions 41 and 45, an end portion 54 which engages inner tube end portion 41, and collar 30. As is the case with the double-walled insert, the upper end portion of member 50 is spaced from inner tube end portion 45.

The inventive insert is accordingly provided to reduce heat loss and thermal shock in the coupling area and, at the same time, allow the maintenance of a smooth bore path.

Some features of the present invention can be used to advantage without use of other features of the invention. While specific embodiments of the invention have been shown and described in detail to illustrate the application of the principles of the invention, it is to be understood that the invention may be embodied otherwise without departing from such principles.

The embodiments of the invention in which an exclusive property or privilege is claimed are defined as follows:

1. Apparatus for conveying a vapor, the apparatus comprising a tubing string of at least two tubular segments, means for coupling the tubular segments to each other with opposed ends in axially spaced relationship whereby a gap is defined therebetween, each tubular segment including an outer tube and an inner tube concentrically disposed within the outer tube and spaced therefrom to define an annulus therebetween, the inner tube having a cylindrical body with end portions which extends radially outwardly to and are joined to the outer tube, insulating means provided in the annulus, the cylindrical body having a cylindrical bore path for conveying a vapor, a cylindrical insert disposed to overlie the end portions of the opposed ends of tube sections radially inwardly thereof, means for engaging the insert to one of the end portions, said insert being spaced apart radially from the other of the end portions whereby vapor is passed from the bore path to the gap so that condensation of the vapor may provide insulation means in the gap, and wherein said insert comprises a cylindrical inner member and a cylindrical outer member, said cylindrical outer member surrounds said cylindrical inner member and is spaced therefrom to define an annular space therebetween, and said inner and outer members are joined at their ends, and further comprising thermal insulation means in said annular space.

2. Apparatus according to claim 1 wherein said insert extends axially outwardly from said one of said end portions and terminates at an end, said coupling means extends axially outwardly from said one of said end portions and beyond said insert end.

3. Apparatus according to claim 1 wherein said engaging means comprises a tapered end portion on said insert a surface of which is in contiguous relation with a mating surface of said one of said end portions.

4. Apparatus according to claim 1 further comprising a stiffening means which extends from said insert into said gap.

5. Apparatus according to claim 4 wherein said stiffening means comprises a collar which circumscribes said insert, said stiffening means includes means defining at least one bore extending through said collar in a direction substantially parallel to the vapor bore path through the inner tube.

6. Apparatus according to claim 1 further comprising a plurality of circumferentially spaced ribs members on one of said inner and outer members, said rib members extend within said annular space to the other of said inner and outer members.

7. Apparatus according to claim 1 wherein said insert overlies both of said end portions over a distance of at least 0.1 foot along each said end portion.

8. Apparatus according to claim 1 wherein said insert overlies both of said end portions over a distance of at least 0.1 foot along each said end portion.

9. Apparatus according to claim 1 wherein said insert overlies both of said end portions over a distance of at least 0.2 foot along each said end portion.

10. Apparatus for conveying a vapor, the apparatus comprising a tubing string of at least two tubular segments, means for coupling the tubular segments to each other with opposed ends in axially spaced relationship whereby a gap is defined therebetween, each tubular segment including an outer tube and an inner tube concentrically disposed within the outer tube and spaced therefrom to define an annulus therebetween, the inner tube having a cylindrical body with end portions which extend radially outwardly to and are joined to the outer tube, insulating means provided in the annulus, the cylindrical body having a cylindrical bore path for conveying a vapor, a cylindrical insert disposed to overlie the end portions of the opposed ends radially inwardly thereof, means for engaging the insert to at least one of said end portions, said insert comprising a cylindrical inner member and a cylindrical outer member, and wherein the cylindrical outer member surrounds the cylindrical inner member and is spaced therefrom to define an annular space therebetween, and said inner and outer cylindrical members being joined at their ends, and further comprising thermal insulation means in said annular space.

11. Apparatus according to claim 10 wherein said insert extends axially outwardly from said one of said end portions and terminates at an end, and said coupling means extends axially outwardly from said one of said end portions and beyond said insert end.

12. Apparatus according to claim 10 wherein said engaging means comprises a tapered end portion on said insert a surface of which is in contiguous relation with a mating surface of said one of said end portions.

13. Apparatus according to claim 10 further comprising a stiffening collar means which circumscribes the insert and extends therefrom into said gap, said collar includes means defining at least one bore extending through said collar in a direction substantially parallel to the vapor bore path through the inner tube.

14. Apparatus according to claim 10 further comprising a plurality of circumferentially spaced ribs members on one of said inner and outer members, said rib members extend within said annular space to the other of said inner and outer members.

15. Apparatus according to claim 10 wherein said insert overlies both of said end portions over a distance of at least 0.1 foot along each said end portion.

16. Apparatus according to claim 10 wherein said insert overlies both of said end portions over a distance of at least 0.2 foot along each said end portion.

17. Apparatus according to claim 10 further comprising a stiffening means which extends from said insert into said gap.

18. Apparatus for conveying a vapor, the apparatus comprising a tubing string of at least two tubular segments, means for coupling the tubular segments to each other with opposed ends in axially spaced relationship whereby a gap is defined therebetween, each tubular segment including an outer tube and an inner tube concentrically disposed within the outer tube and spaced therefrom to define an annulus therebetween, the inner tube having a cylindrical body with end portions which extend radially outwardly to and are joined to the outer tube, insulating means provided in the annulus, the cylindrical body having a cylidrical bore path for conveying vapor, a cylindrical insert disposed to overlie the end portions of the opposed ends radially inwardly thereof, means for engaging the insert to one of the end portions, said insert being spaced apart radially from the other of the end portions whereby vapor is passed from the bore path to the gap so that condensation of the vapor may provide insulation means in the gap, and further comprising means on the insert which extends into said gap for reducing circulation currents in water which is disposed in said gap.

19. Apparatus for conveying a vapor, the apparatus comprising a tubing string of at least two tubular segments, means for coupling the tubular segments to each other with opposed ends in axially spaced relationship whereby a gap is defined therebetween, each tubular segment including an outer tube and an inner tube concentrically disposed within the outer tube and spaced therefrom to define an annulus therebetween, the inner tube having a cylindrical body with end portions which extend radially outwardly to and are joined to the outer tube, insulation provided in the annulus, the cylidrical body having a cylindrical bore path for conveying a vapor, a cylindrical insert disposed to overlie the end portions of the opposed ends radially inwardly thereof, means for engaging the insert to at least one of said end portions, said insert comprising cylindrical inner member and a cylindrical outer member, and wherein the cylindrical outer member surrounds the cylindrical inner member and is spaced therefrom to define an annular space therebetween, and said inner and outer cylindrical members are joined at their ends, wherein vapor condenses into water in said gap and further comprising means on the insert which extends into the gap for reducing circulation in the water which is disposed in the gap.

20. Apparatus for conveying a vapor, the apparatus comprising a tubing string of at least two tubular segments, means for coupling the tubular segments to each other with opposed ends in axially spaced relationship whereby a gap is defined therebetween, each tubular segment including an outer tube and an inner tube concentrically disposed within the outer tube and spaced therefrom to define an annulus between the inner and outer tubes, the inner tube having a cylindrical body with end portions which extend radially outwardly to and are joined to said outer tube, means for insulating the annulus, the inner tube cylindrical body having a cylindrical bore path for conveying a vapor, a cylindrical insert disposed to overlie the end portions radially inwardly thereof, means for engaging the insert to one of the end portions, means for sealingly engaging the insert to the coupling to define an area in the gap to contain water between the coupling means and the insert, and means for passing vapor from the bore path to the area in the gap so that the vapor may condense and thereby provide water as insulation means in the gap.

21. Apparatus according to claim 20 wherein said vapor passing means comprises a space between the insert and one of the end portions.

22. Apparatus according to claim 20 wherein said engaging means includes means for threadably connecting the insert to the coupling.

23. Apparatus according to claim 20 further comprising a stiffening means which extends from said insert into the gap.

24. Apparatus according to claim 20 wherein said engaging means comprises a collar which circumscribes said insert.

25. Apparatus for conveying vapor, the apparatus comprising a tubing string of at least two tubular segments, means for coupling the tubular segments to each other with opposed ends in axially spaced relationship whereby a gap is defined therebetween, each tubular segment including an outer tube and an inner tube concentrically disposed within the outer tube and spaced therefrom to define an annulus between the inner and outer tubes, the inner tube having a cylindrical body with end portions which extend radially outwardly to and are joined to the outer tube, means for insulating the annulus, the cylindrical body having a cylindrical bore path for conveying a vapor, a cylindrical insert disposed to overlie the end portions of the opposed ends radially inwardly thereof, and means for sealingly engaging the insert to one of the end portions to define an area in the gap between the coupling means and the gap to contain water, and means for passing vapor from the bore path to an area in the gap so that vapor may condense and thereby provide water as insulation means in the gap.

26. Apparatus according to claim 25 wherein said vapor passing means comprises a space between the insert and one of the end portions.

27. Apparatus according to claim 25 wherein the engaging means comprises a tapered end portion surface on the insert.

28. Apparatus according to claim 27 whrein the engaging means comprises a mating surface on the said one of the end portions which is in contiguous relation with said tapered end portion surface on the insert.

29. Apparatus according to claim 25 further comprising a stiffening means which extends from said insert into the gap.

30. Apparatus according to claim 29 wherein said stiffening means comprises a collar which circumscribes the insert.

* * * * *